July 11, 1961 W. R. POLANIN 2,991,848
CLASP BRAKE ARRANGEMENT
Filed Nov. 15, 1957 2 Sheets-Sheet 1
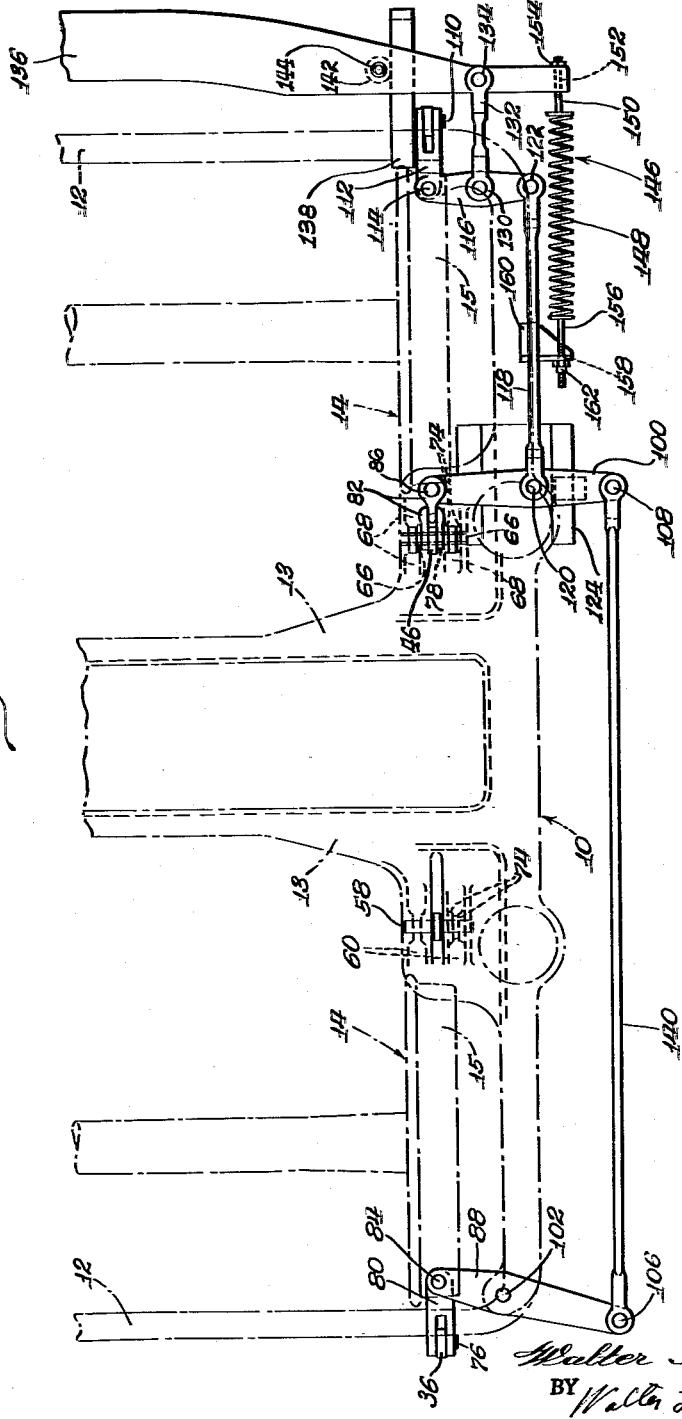
INVENTOR.
Walter R. Polanin
BY Walter S. Schlegel, Jr.
Atty.
Witness:
Richard W. Carpenter July 11, 1961 — W. R. POLANIN — 2,991,848
CLASP BRAKE ARRANGEMENT
Filed Nov. 15, 1957 — 2 Sheets-Sheet 2
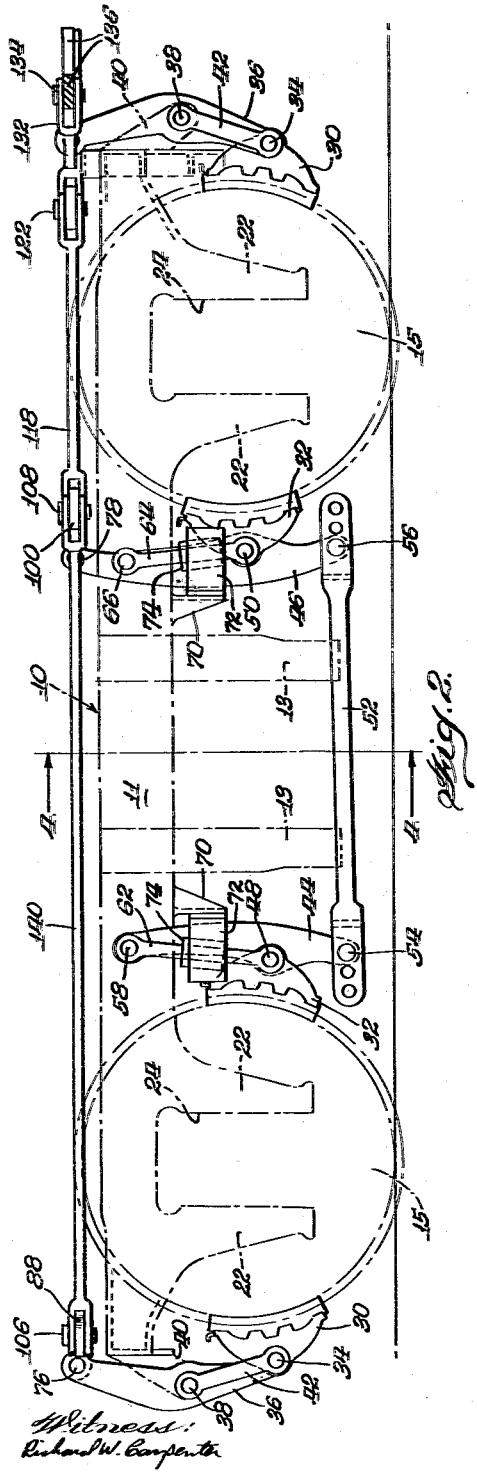
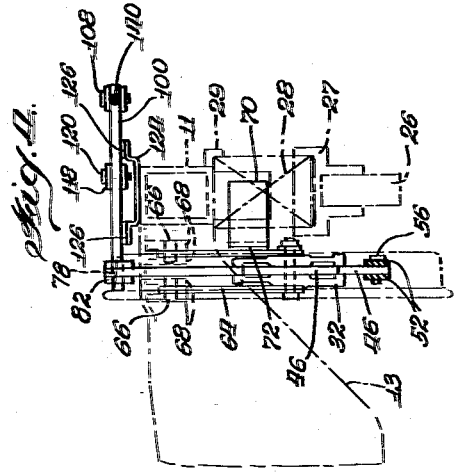
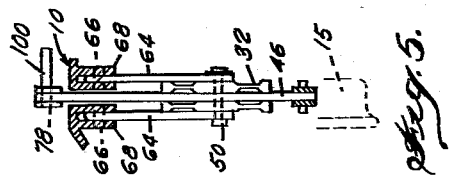
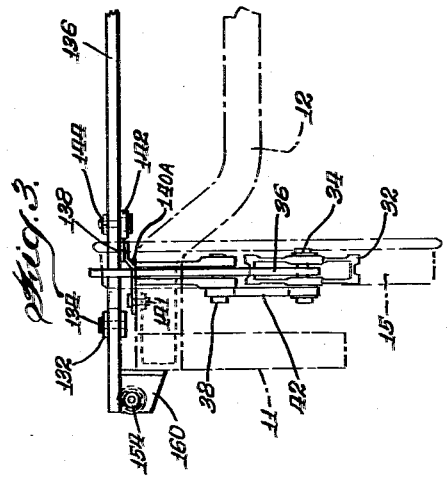
INVENTOR.
Walter R. Polanin
BY Walter L. Schlegel, Jr.
Atty.

United States Patent Office 2,991,848
Patented July 11, 1961

2,991,848
CLASP BRAKE ARRANGEMENT
Walter R. Polanin, Chicago, Ill., assignor to American Steel Foundries, Chicago, Ill., a corporation of New Jersey
Filed Nov. 15, 1957, Ser. No. 696,647
4 Claims. (Cl. 188—56)

This invention relates to railway brakes and more particularly to an improved linkage system for clasp brakes.

The invention comprehends a clasp brake linkage arrangement of the non-unit cylinder type wherein friction means engageable with opposite sides of a pair of wheel and axle assemblies are urged into engagement with the assemblies by a power source mounted on the railway car at some place remote from the truck.

In the case of self propelled railway vehicle such as diesel and electric motor cars, the motors and related mechanisms occupy the greatest portion of the available space on the trucks and leave little room available for the linkage elements of a conventional clasp brake arrangement.

Accordingly, it is an important object of the invention to provide an improved clasp brake linkage system for connecting the friction means engageable with the wheel and axle assemblies to a power source located on the car at some place remote from the truck.

Another object of the invention is to provide a clasp brake linkage system of simple design and construction and having a minimum number of elements disposed between the side members of the railway car truck to which it is applied.

A more specific object of the invention is to provide a clasp brake linkage system for a railway car truck wherein none of the brake levers or connecting rods or straps are located inboardly of the wheels.

These and other objects of the invention will be apparent from an examination of the following description and drawings, wherein:

FIGURE 1 is a fragmentary top plan view of a portion of a railway car truck to which has been applied a clasp brake arrangement embodying features of my invention;

FIGURE 2 is a side elevational view of the structure illustrated in FIGURE 1;

FIGURE 3 is an end elevational view of the structure illustrated in FIGURE 2, as seen from the right;

FIGURE 4 is a fragmentary sectional view taken on line 4—4 of FIGURE 2; and

FIGURE 5 is a fragmentary view showing certain details of the mounting of one of the brake levers.

It will be understood that certain elements have been intentionally omitted from certain views where they are illustrated to better advantage in other views.

Referring now to the drawings for a better understanding of the invention, it will be seen that a clasp brake linkage arrangement embodying features of my invention is shown as applied to a railway car truck comprising a frame indicated generally at 10 having transversely spaced longitudinally extending side members 11 inter-connected at their ends by a pair of transversely extending end rails 12 and intermediate their ends by a pair of transversely extending transoms 13. The frame is supported on a pair of spaced wheel and axle assemblies 14, each of which includes a pair of wheels 15. The side members 11 are provided at the ends thereof with depending pairs of pedestal jaws 22 which define therebetween openings 24 in which may be received journal boxes (not shown) housing the ends of the wheel and axle assemblies 14 in a conventional manner known to those familiar with the art. The frame 10 may be resiliently supported on the wheel and axle assemblies 14 in the usual manner by means of longitudinally extending equalizers 26 having their ends (not shown) supported on the journal boxes of the respective assemblies. A pair of coil compression springs 28 may be interposed between vertically aligned pairs of spring seats 27 and 29 presented by the equalizers 26 and truck frame side members 11, respectively.

The actual deceleration or braking of the wheel and axle assemblies 14 is accomplished by a plurality of brake shoe assemblies disposed on opposite sides of, and engageable with, the wheels 15 of each assembly, the outer brake shoe assemblies being designated by the numeral 30 and the inner brake shoe assemblies being designated by the numeral 32.

The outer brake shoe assemblies 30 are pivotally connected by pins 34 to the lower ends of vertically disposed dead brake levers 36, the levers being fulcrumed intermediate their ends by pins 38 to brackets 40 extending outwardly from the ends of the frame 10.

Additional support for the outer brake shoe assemblies 30 may be provided by pairs of hangers 42 which have their upper and lower ends pivotally connected by common pivot pins 38 and 34 to the brackets 40 and brake shoe assemblies 30, respectively.

As best seen in FIGURE 2, a pair of generally vertically extending dead and live brake levers 44 and 46 are pivotally connected by pins 48 and 50, respectively, to the left and right hand inner brake shoe assemblies 32. The lower ends of the brake levers 44 and 46 may be interconnected by a generally horizontal extending compression rod 52 having its opposite ends pivotally connected by pins 54 and 56 to the respective dead and live brake levers 44 and 46. The upper end of the dead inner brake lever 44 may be fulcrumed to the frame side member 11 by means of a pin 58 disposed to extend through a pair of lugs 60 depending from the side member 11 of the frame adjacent transom 13. Additional support for the dead inner brake lever 44 may be provided by means of a hanger 62 having its upper and lower ends pivotally connected to the lugs 60 and the brake shoe assembly 32 by means of common pivotal pins 58 and 48, respectively. The live lever 46 may also be additionally supported by a pair of hangers 64 having their upper ends pivotally connected by pins 66 to a pair of depending side member lugs 68 and their lower ends pivotally connected to the brake shoe assembly 32, and to the lever 46, by common pivotal pin 50. This arrangement is best shown in FIGURE 5 in which the details of the lever 46 and related elements are isolated from the other elements of the construction, this figure being oriented according to FIGURE 4.

In order to limit lateral movement of the inner brake levers 44 and 46, there may be provided a pair of guide brackets 70 preferably rigidly secured to and depending from frame side member 11. Each bracket 70 includes a strap or plate element 72 extending longitudinally of the truck and disposed adjacent the related brake lever to prevent its movement in an outboard direction. The lever may be provided with a wear plate or pad 74 in order to prevent wear on the lever itself.

As best seen in FIGURE 1, the upper ends of the left hand outer brake lever 36 and the right hand or live inner brake lever 46 are pivotally connected by pins 76 and 78 to links or clevices 80 and 82, respectively, the opposite ends of the links 80 and 82 being pivotally connected by pins 84 and 86 to the inboard ends of generally horizontally disposed dead and live actuating levers 88 and 100, respectively. The dead actuating lever 88 may be fulcrumed to the frame intermediate its ends by pin 102. The dead and live actuating levers 88 and 100 may be interconnected by means of a tension rod 140 having its opposite ends pivotally connected by pins 106 and 108 to the outboard ends of the respective dead and live actuating levers.

The upper end of the right hand outer brake lever 36 is pivotally connected as best seen in FIGURE 1 by pin 110 to one end of a link 112, the other end of which, is pivotally connected by pin 114 to the inboard end of a generally horizontally disposed live actuating or operating lever 116.

The live actuating lever 100 and the live actuating or operating lever 116 may be interconected by means of a generally horizontally disposed tension rod 118 having one end pivotally connected by pin 120 to the lever 100 intermediate the ends of said lever and having its other end pivotally connected by pin 122 to the outboard end of lever 116.

As best seen in FIGURE 4, additional support may be provided for the live actuating lever 100 by means of a generally U-shaped support bracket 124 having a pair of wear pads 126 slidably engageable with the under side of the lever.

In order to provide a source of power for the brake arrangement, the operating lever 116 may be pivotally connected intermediate its ends by a pin 130 to one end of a tension link 132, the opposite end of which, is pivotally connected by pin 134 to an equalizer bar or yoke 136 at a point inboardly adjacent the outer extremity of said bar.

Although only a portion of the truck is shown in the drawing, it will be understood that the opposite side of the truck contains a similar linkage arrangement which is connected to the opposite end of the equalizer bar 136. Both linkage arrangements can then be operated by the bar which in turn is actuated by means of a power source located somewhere on the car remote from the truck and operatively connected to the bar at some point intermediate the ends of the bar. Inasmuch as this portion of the structure does not comprise an essential feature of the invention, it is not shown in detail on the drawings.

As best seen in FIGURE 3, support and control for the bar 136 may be provided by means of a guide bar 138 extending longitudinally of the truck outwardly from a guide bar bracket 140a secured by nut and bolt assembly 141 to the end rail 12. The guide bar 138 is disposed under the equalizer bar 136 so as to afford sliding support therefor.

A roller 142 may be secured to the equalizer bar 136 by means of a nut and bolt assembly 144 for engagement with an adjacent surface of the guide bar 138 in order to limit the lateral outward movement of the equalizer bar 136 relative to the truck.

As best seen in FIGURE 1, a release spring assembly 146 may be provided to insure the retention of the brake mechanism in its non-operative position at all times other than when it is desired to apply the brakes. The release spring assembly 146 preferably comprises a coil tension spring 148 having one end connected to a spring rod 150, presenting a threaded portion extending through an aperture 152 in the equalizer bar at the outer extremity of the bar and retained in position in aperture 152 by a nut 154. The opposite end of the spring is connected to a rod 156 presenting a threaded portion received through an aperture 158 of a spring bracket 160 mounted on the frame side member 11 and retained in position in aperture 158 by means of a nut 162.

Thus, it will be seen that I have provided a simple, compact, and efficient linkage arrangement for connecting clasp brake friction means to a power unit disposed without the truck, which arrangement is disposed and arranged to occupy a minimum amount of space on the truck and which contains no parts disposed between the wheels of the wheel and axle assemblies so as to leave this space available for mounting motors or other equipment on the truck.

I claim:

1. In a clasp brake arrangement for a four-wheel railway car truck having a pair of spaced wheel and axle assemblies and a frame supported thereon, the combination of: sets of inner and outer vertical brake levers disposed inwardly and outwardly adjacent the respective assemblies, the outer brake lever of each set being a dead lever fulcrumed intermediate its ends to the frame and being pivotally connected at its lower end to friction means engageable with the related assembly, the inner brake lever of each set being pivotally connected intermediate its ends to friction means engageable with the related assembly, the inner brake lever of one set being a live lever, the inner brake lever of the other set being a dead lever fulcrumed at its upper end to the frame; a compression rod pivotally interconnecting the lower ends of the inner brake levers; a pair of generally transversely extending horizontal levers pivotally connected at their inboard ends to the upper ends of the respective outer brake levers, the horizontal lever connected to the brake lever of said one set being a live operating lever, the other horizontal lever being a dead actuating lever fulcrumed intermediate its ends to the frame; another generally transversely extending horizontal live actuating lever pivotally connected at its inboard end to the upper end of the live brake lever; a tension rod pivotally interconnecting the outboard ends of the actuating levers; and another tension rod pivotally interconnecting the outboard end of the operating lever and a medial portion of the live actuating lever.

2. A clasp brake arrangement according to claim 1, wherein all of said levers and rods are located outboardly of a longitudinal vertical plane defined by the inboard surfaces of the wheels of said wheel and axle assemblies.

3. A clasp brake arrangement according to claim 1, and including an equalizer bar located outwardly adjacent one end of the truck and disposed to extend transversely thereof, and a tension link pivotally interconnecting a medial portion of the operating lever and the outboard end of the equalizer bar.

4. A clasp brake arrangement according to claim 3, wherein said link is connected to said equalizer bar at a place inwardly adjacent one end of the bar, and wherein said arrangement includes a release spring having one end operatively connected to the truck frame and having the other end operatively connected to said one end of the bar.

References Cited in the file of this patent

UNITED STATES PATENTS

| | | |
|---|---|---|
| 1,807,575 | Mussey | May 26, 1931 |
| 1,969,114 | Baselt | Aug. 7, 1934 |
| 2,237,509 | Tack | Apr. 8, 1941 |
| 2,716,468 | Simanek | Aug. 30, 1955 |